US008325616B2

(12) United States Patent
Huang et al.

(10) Patent No.: US 8,325,616 B2
(45) Date of Patent: Dec. 4, 2012

(54) METHOD AND SYSTEM FOR DETERMINATION AND EXCHANGE OF NETWORK TIMING INFORMATION

(75) Inventors: Weida Huang, Cupertino, CA (US); Yongbum Kim, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 311 days.

(21) Appl. No.: 12/015,671

(22) Filed: Jan. 17, 2008

(65) Prior Publication Data
US 2009/0185501 A1 Jul. 23, 2009

(51) Int. Cl.
*H04J 1/16* (2006.01)
(52) U.S. Cl. .................................. 370/252; 370/244
(58) Field of Classification Search ............... 370/241, 370/252, 251, 241.1, 244; 398/154
See application file for complete search history.

(56) References Cited

U.S. PATENT DOCUMENTS

| | | | |
|---|---|---|---|
| 6,885,641 B1 | 4/2005 | Chan et al. | |
| 7,295,548 B2* | 11/2007 | Blank et al. | 370/352 |
| 7,302,269 B1 | 11/2007 | Crawford | |
| 7,408,337 B2 | 8/2008 | Persons | |
| 2002/0039371 A1 | 4/2002 | Hedayat et al. | |
| 2002/0080726 A1* | 6/2002 | Klassen et al. | 370/252 |
| 2003/0046022 A1 | 3/2003 | Silverman | |
| 2003/0225893 A1 | 12/2003 | Roese et al. | |
| 2004/0233874 A1* | 11/2004 | Baker | 370/335 |
| 2006/0187916 A1* | 8/2006 | Vasseur et al. | 370/389 |
| 2007/0153772 A1* | 7/2007 | Shankar J et al. | 370/352 |
| 2007/0189184 A1* | 8/2007 | Ryu et al. | 370/252 |
| 2008/0008203 A1* | 1/2008 | Frankkila et al. | 370/412 |
| 2008/0010367 A1* | 1/2008 | Chen et al. | 709/223 |
| 2008/0031136 A1 | 2/2008 | Gavette et al. | |
| 2008/0056231 A1 | 3/2008 | Langner | |
| 2008/0101253 A1* | 5/2008 | Shvodian | 370/252 |
| 2008/0123555 A1 | 5/2008 | Qi et al. | |
| 2008/0285981 A1* | 11/2008 | Diab et al. | 398/154 |
| 2009/0049175 A1* | 2/2009 | Finn | 709/226 |

* cited by examiner

*Primary Examiner* — Kibrom T Hailu
*Assistant Examiner* — Dady Chery
(74) *Attorney, Agent, or Firm* — Thomas, Kayden, Horstemeyer & Risley, LLP

(57) ABSTRACT

Aspects of a method and system for determination and exchange of network timing information are provided. In this regard, for each network hop traversed by a packet, a propagation delay of said network hop may be determined. Moreover, the propagation delay, and/or a hop length calculated utilizing the propagation delay, may be appended to the packet. The packet may, for example, be a MMRP registration packet or a SRP reservation packet. The packet may be dropped in instances that the propagation delay and/or length of a one or more traversed network hops is outside a determined range. The hop length may be determined by multiplying the propagation delay by a speed of propagation on the hop. The speed of propagation may be determined based on the physical layer technology associated with the network hop. Digital rights management may be implemented for media communicated on the network hop based at least in part on the hop length or the propagation delay. In this regard, use of media content may be restricted to a specified location.

24 Claims, 9 Drawing Sheets

METHOD AND SYSTEM FOR DETERMINATION AND EXCHANGE OF NETWORK TIMING INFORMATION

CROSS-REFERENCE TO RELATED APPLICATIONS/INCORPORATION BY REFERENCE

Not Applicable

FIELD OF THE INVENTION

Certain embodiments of the invention relate to networking. More specifically, certain embodiments of the invention relate to a method and system for determination and exchange of network timing information.

BACKGROUND OF THE INVENTION

Accurately determining the delay along a physical link from a sender to a receiver, may be useful in many applications. For example, determining the delay from a source of an emergency call (911 in the USA, for example) to a police switchboard may be critical for emergency workers to respond effectively. In this regard, traditional circuit switched telephone networks are deterministic in that the path and delay of information over the network is known, and as a result, the source of the call may be determined. However, for a VoIP phone, determining the delay of a 911 call from source to receiver with sufficient accuracy is difficult if not impossible, using conventional technology. In this regard, obtaining accurate delay information in non-deterministic, packet switched networks (PSN), such as the Internet, is difficult due to variable delays caused by factors such as the operating system of a traversed network node, network congestion, and routing path, for example. One method conventionally used to determine delays between nodes in a network is time-domain reflectometry (TDR). However, if there are no discontinuities in the physical links, or the connections are very well matched, then TDR does not provide a very accurate measurement. Accordingly, conventional methods for determining the path delay between a source and a destination of a packet provide insufficient accuracy for many applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for determination and exchange of network timing information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the invention may enable calculating a propagation delay on a network link (hop) and translating that delay into distance for a given physical layer technology. Moreover, the propagation delay and/or distance information may be appended onto various control protocols to convey the delay and distance measurements for the path. Furthermore, the determined delay on a physical link (hop) communicated between link peers may provide a way for an application to measure overall path delay of a given application. Additionally, accurate delay measurements may be translated as accurate distance measurement when propagation delay of given link is used to calculate the link distance. In this regard, determining actual network path distance may enable a Digital Rights Management (DRM) system to limit how far content may be transferred from the source. For example, a DRM policy may restrict media content to distances that lie within a home.

Certain embodiments of the invention may be found in a method and system for determination and exchange of network timing information. In this regard, for each network hop traversed by a packet, a propagation delay of said network hop may be determined. Moreover, the propagation delay, and/or a hop length calculated utilizing the propagation delay, may be appended to the packet. The packet may, for example, be a MMRP registration packet or a SRP reservation packet. The packet may be dropped or not serviced in instances that the propagation delay and/or length of a one or more traversed network hops is outside a determined range. The hop length may be determined by multiplying the propagation delay by a speed of propagation on the hop. The speed of propagation may be determined based on the physical layer technology associated with the network hop. Digital rights management may be implemented for media communicated on the network hop based at least in part on the hop length or the propagation delay. In this regard, use of media content may be restricted to a specified location.

Figure 1A:
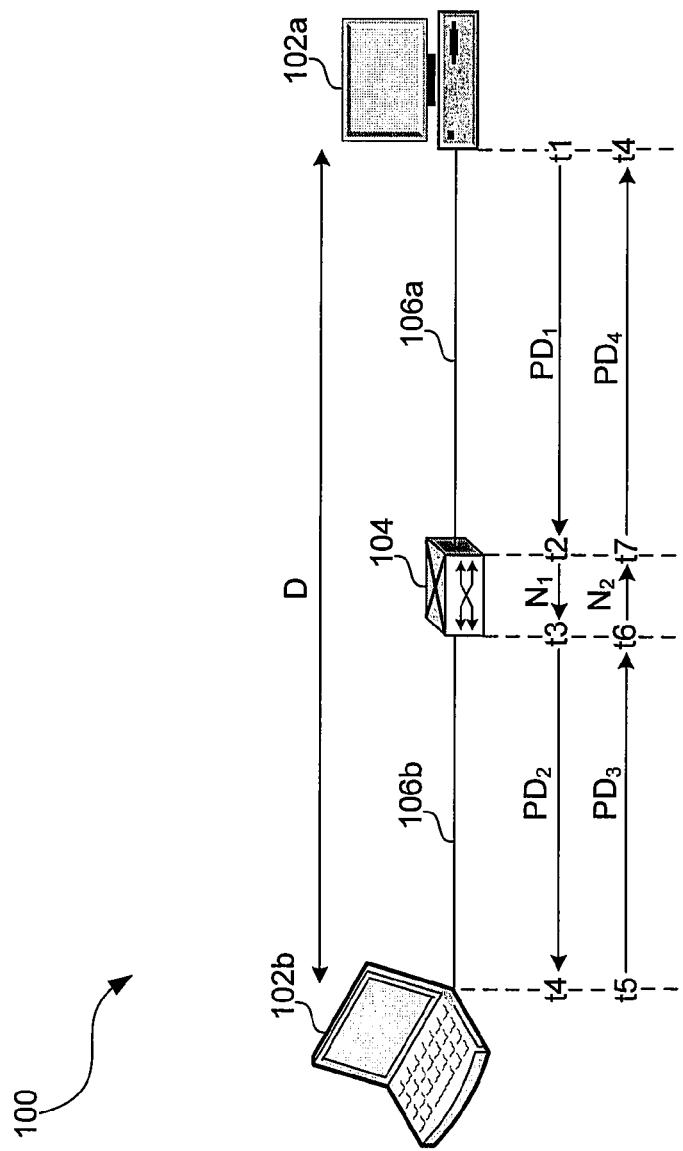
FIG. 1A is diagram of an exemplary network for which proximity information may be determined, in accordance with an embodiment of the invention.

FIG. 1A is diagram of an exemplary network for which timing information may be determined, in accordance with an embodiment of the invention. Referring to FIG. 1A the network may comprise end systems 102a, 102b, switch 104, and physical links 106a, 106b. In one embodiment of the invention, the end system 102b may, for example, comprise one or more applications for which use may be restricted by a digital rights management (DRM) policy. For example, the DRM may require that the application only be used in a defined location and/or within a certain boundary. In this regard, the location may be determined by the distance from the end system 102b to the end system 102a. Accordingly, the end system 102a may be a server responsible for enforcing the DRM policy. In another embodiment of the invention, the end system 102b may comprise a VoIP phone utilized to place an Emergency 911 call and the end system 102a may be a server or other node responsible for determining the location from which the 911 call was placed. Also, in various exemplary embodiments of the invention, the network 100 may utilize Ethernet technology.

The end systems 102a, 102b may comprise suitable logic, circuitry, and/or code that may enable generation, transmission, and/or reception of messages to/from the network 100. In this regard, the end systems 102a, 102b, may comprise one or more system clocks and may enable utilizing protocols such as IEEE 1588 and IEEE 802.1AS to synchronize the system clocks. Accordingly, transmitted and/or received packets may be identified in the physical layer (Layer 1 of the OSI model) and the corresponding timestamp may be stored, forwarded with the packet, and/or transmitted in one or more subsequent packets.

Additionally, the end systems 102a, 102b may comprise suitable logic, circuitry, and/or code that may enable implementing one or more security protocols. In this regard, information exchanged between the end systems 102a, 102b may be authenticated, validated, and/or encrypted. Accordingly, aspects of the invention may enable ensuring that the end systems 102a, 102b reliably synchronize to one or more clocks and reliably transmit accurate timing information. In this regard, exemplary security protocols utilized may comprise Ipsec, IEEE 802.1AE (MACsec, encryption), IEEE 802.1af (authentication and key management), and/or IEEE 802.1AR (Secure Device ID, authentication).

The switch 104 may comprise suitable logic, circuitry, and/or code that may enable transmission and/or reception of messages to/from the network 100. In this regard, the switch 104 may comprise one or more system clocks and may enable utilizing protocols such as IEEE 1588 and IEEE 802.1AS to synchronize the one or more system clocks to system clocks comprising other nodes connected to the network 100. Accordingly, transmitted and/or received packets may be identified in the physical layer (Layer 1 of the OSI model) and the corresponding timestamp may be stored, forwarded with the packet, and/or transmitted in one or more subsequent packets.

Additionally, the switch 104 may comprise suitable logic, circuitry, and/or code that may enable usage of one or more security protocols. In this regard, data transmitted and/or received by the switch 104 may be authenticated, validated, and/or encrypted. Accordingly, aspects of the invention may enable ensuring that the switch 104 reliably synchronizes to one or more clocks and reliably transmits accurate timing information. In this regard, exemplary security protocols utilized may comprise IPsec, IEEE 802.1AE (MACsec), IEEE 802.1af (authentication and key management), and/or IEEE 802.1AR (Secure Device ID).

The links 106a, 106b may comprise physical links connecting the nodes comprising the network 100. In this regard, the physical links may, for example, comprise one or more of the following: coaxial cable, twisted pair cabling, fiber optic cabling, and one or more wireless channels.

In an exemplary operation, end system 102a may act as a master clock and may initiate synchronization, utilizing the precision time protocol (PTP), for example, with the end system 102b and the switch 104. In this regard, each of the nodes 102a, 102b, and 104 may comprise one or more security features to ensure that the synchronization protocol is adhered to and that packets transmitted over the network 100 are not tampered with, spoofed, or compromised in any other manner. For example, each of the nodes 102a, 102b, and 104 may comprise a secure device ID that may enable authenticating, validating, and/or encrypting/decrypting data. In various embodiments of the invention, the secure device ID may be stored in Hardware and may be utilized for key generation and management.

Upon completing a secure PTP synchronization, timing information may be inserted into and/or appended to packets transmitted in the network 100. For example, the end system 102a may transmit a first packet to the end system 102b. In this regard, the end system 102a may generate a timestamp, t1, at the instant the first packet is placed onto the link 106a. Shortly thereafter, the end system 102a may transmit a timestamp packet containing t1 onto the link 106a. The first packet may arrive at the PHY of switch 104 at time instant t2, and the timestamp packet containing t1 may arrive shortly thereafter. The switch 104 may authenticate and/or decrypt either or both packets, as necessary.

In one embodiment of the invention, the switch 104 may calculate propagation delay, $PD_1$, of the link 106a and subsequently, prepare the first packet for forwarding. In this regard, $PD_1$ may be inserted in and/or appended to the first packet. The first packet, modified to contain $PD_1$, may then be forwarded onto the link 106b at time instant t3. In another embodiment of the invention, t1, t2, or some combination of t1 and t2, may be inserted in and/or appended to the first packet. The first packet, modified to contain t1, t2, or some combination of t1 and t2, may then be forwarded onto the link 106b at time t3. Shortly after transmitting the first packet, the switch 104 may transmit a timestamp packet containing t3 onto the link 106b. The first packet may arrive at the PHY of the end system 102b at time instant t4, and the timestamp packet containing t3 may arrive shortly thereafter. The end system 102b may authenticate and/or decrypt either or both packets as necessary.

In one embodiment of the invention, the end system 102b may calculate propagation delay, $PD_2$, of the link 106b and subsequently, prepare a reply packet. In this regard, $PD_1$, $PD_2$, or some combination of PD1 and PD2, may be inserted in and/or appended to the reply packet. The reply packet, modified to contain $PD_1$, $PD_2$, or some combination of PD1 and PD2, may then be forwarded onto the link 106b at time t5. In another embodiment of the invention, t1, t2, t3, t4, or some combination of t1, t2, t3, and/or t4, may be inserted in and/or appended to the reply packet. The reply packet, modified to contain t1, t2, t3, t4, or some combination of t1, t2, t3, and/or t4, may then be forwarded onto the link 106b at time t5. The reply packet may travel to the system 102a via the switch 104, with timing information being added at each hop, in the same manner as the first packet. Thus, the reply packet may convey t1 through t8 or some combination thereof, and/or $PD_1$ through $PD_4$, or some combination thereof, to the end system 102a. In this manner, a node in the network 100 may be enabled to determine and convey accurate timing information.

In an exemplary embodiment, the timing information may be utilized to determine distances between nodes in the network 100. For example, the propagation speed of the packet along each of the links 106a and 106b may be known and thus an accurate determination of the distance, D, between the end systems 102a and 102b may be determined utilizing the following relationship:

$$D = ((t2 - t1) \cdot S_A + (t4 - t3) \cdot S_B + (t6 - t5) \cdot S_B + (t8 - t7) \cdot S_A)/2 \quad \text{EQ. 1}$$
$$= (PD_1 \cdot S_A + PD_2 \cdot S_B + PD_3 \cdot S_B + PD_4 \cdot S_A)/2$$

where $S_A$ and $S_B$ are the speed of propagation along link 106a and 106b respectively. For example, if the links 106a and 106b are coaxial cable, the data may propagate at a speed of (⅔)*c, where 'c' is the speed of light.

In another exemplary embodiment of the invention, the processing time, PT, of a node and/or path comprising the network 100 may be determined. For example, the processing time of the switch 104, $PT_{N1}$, may be determined utilizing the following relationship:

$$PT_{N1} = (t3 - t2). \quad \text{EQ. 2}$$

Similarly, the round trip processing time from the end system 102a to the end system 102b and back, $PT_{RT1}$, may be determined utilizing the following relationship:

$$PT_{RT} = (t3 - t2) + (t5 - t4) + (t7 - t6) \quad \text{EQ. 3}$$

Accordingly, processing times may be utilized, for example, to select an optimum path across a network.

Figure 1B:
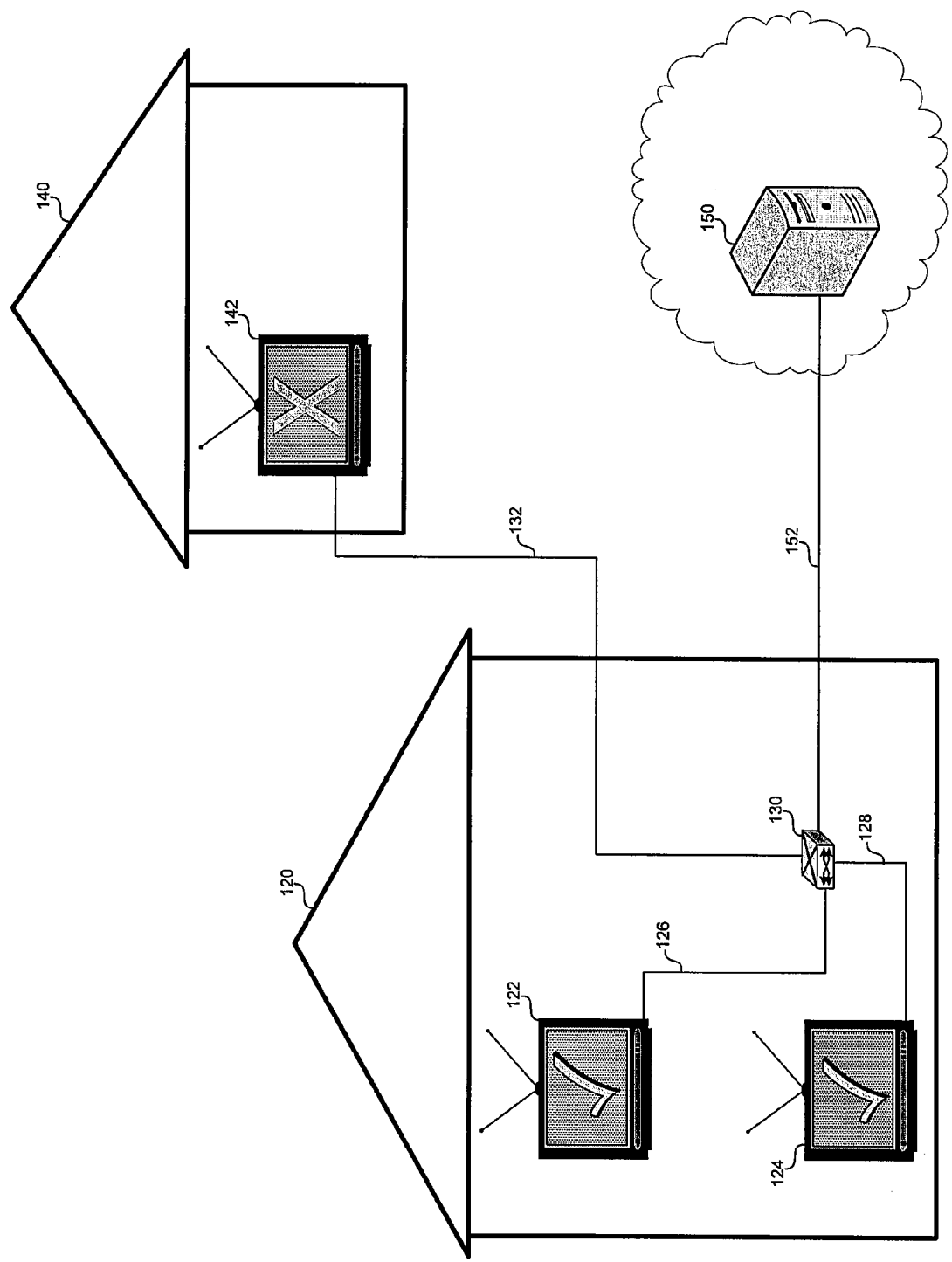
FIG. 1B is an exemplary diagram illustrating the utilization of network proximity information to implement Digital Rights Management (DRM), in accordance with an embodiment of the invention.

FIG. 1B is an exemplary diagram illustrating the utilization of network proximity information to implement digital rights management (DRM), in accordance with an embodiment of the invention. Referring to FIG. 1B, there is shown a licensed house 120 an unlicensed house 140, and a content server 150. The licensed house 120 may further comprise televisions 122 and 124 and a network gateway 130. The unlicensed house may comprise a television 142.

The network gateway 130 may be similar to or the same as the switch 104 disclosed in FIG. 1A. The content server 150 and the televisions 122, 124, and 142 may be similar to or the same as one or more of the end systems 102 disclosed in FIG. 1A. In this regard, the content server 150 and/or the televisions 122 and 124 may be enabled to generate, transmit, and/or receive proximity information and/or information utilized in determining network proximity in a manner similar to or the same as in the network 100 of FIG. 1A.

In operation, the content server 150 may, for example, provide DRM protected television over IP (IPTV). In this regard, the household 120 may be a subscriber to the IPTV services while the household 140 may not be a subscriber. By utilizing network proximity information, the IPTV content may be restricted to the house 120 based on the distance from a television to the network gateway 130. In this regard, the network cables 126 and 128 may be less than a maximum distance, while the network cable 132 may exceed a maximum distance. Accordingly, the IPTV services may be viewed on the televisions 122 and 124, but not on the television 142. Similarly, if a TV, such as the TV 142, can not provide proximity information, it may not be granted access to the restricted content.

Figure 2:
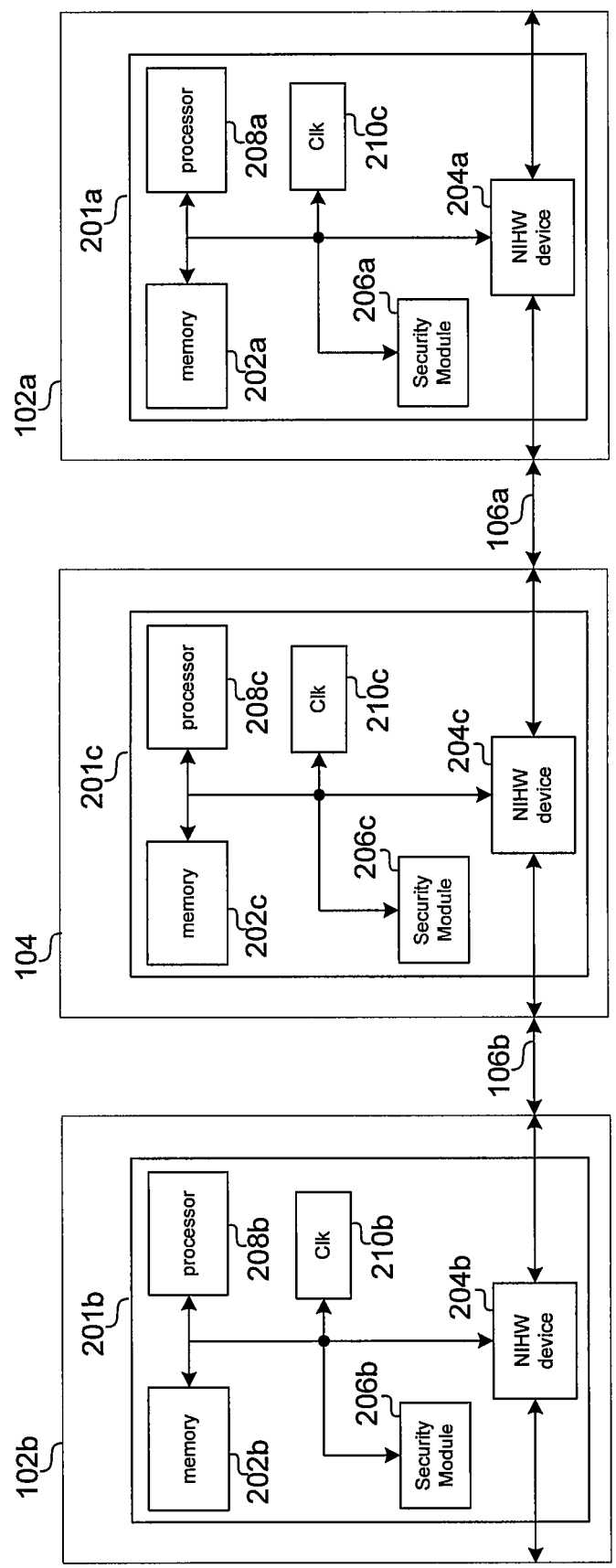
FIG. 2 is a block diagram of a packet processing core, in accordance with an embodiment of the invention.

FIG. 2 is a block diagram of a packet processing core 201 comprising the nodes 102a, 102b, 104 described in FIG. 1A, in accordance with an embodiment of the invention. Referring to FIG. 2, the processing core 201 may comprise a memory 202, a network interface hardware (NIHW) device 204, a security module 206, a clock 210, and a processor 208.

The memory 202 may comprise suitable logic, circuitry, and/or code that may enable storing information utilized for processing packets. In this regard, the memory may enable storing of keys, security protocols, and other information, which may be utilized by nodes connected to the network 100. Additionally, the memory may be used to buffer data, and/or store temporary data. In this regard, the memory may enable storing timing information contained in received packets and/or generated by the NIHW device 204.

The NIHW device 204 may comprise suitable logic, circuitry, and/or code that may enable reception and/or transmission of packets in a network. In this regard, the NIHW device 204 may enable reception and/or transmission of bits over a physical medium and may enable communicating the received bits to the processor 406 and/or the memory 202. Additionally, the NIHW device 204 may enable detecting the arrival of bits over a physical medium and generating a corresponding timestamp. Similarly, the NIHW device 204 may enable generation of timestamps corresponding to bits it transmits. In an exemplary embodiment of the invention, the NIHW device 201 may interface to a network utilizing Ethernet technology.

The security module 206 may comprise suitable logic circuitry and/or code that may enable authentication, validation, encryption, and/or decryption of data. In this regard, the data may be received via the NIHW device 204 and/or may be internally generated in the processing core 201. Accordingly, the security module 206 may enable generating and sharing secured keys which may be utilized for a number of security protocols. In an exemplary embodiment, the security module 206 may comprise a factory installed device ID which may be generated utilizing a true hardware random number generator and may be protected so it may never leave a secure hardware boundary. In this manner, the security module 206 may support numerous security protocols including, but not limited to, MACsec and IPsec protocols.

The clock 210 may comprise suitable logic, circuitry, and/or code that may enable generation of a time reference signal. In this regard, the clock 210 may provide one or more control signals to the memory 202, the NIHW device 204, the security module 206, and/or the processor 208. Additionally, the clock may be programmable and/or adjustable based on one or more signals received from the memory 202, the NIHW device 204, the security module 206, and/or the processor 208.

The processor 208 may comprise suitable logic, circuitry, and/or code that may enable interfacing with the memory 202, the NIHW device 204, and the hardware security module 206 to generate, receive, process, and/or forward packets. In this regard, the processor 208 may be enabled to perform calculations utilizing timing contained in received packets and/or generated by the NIHW device 204. Also, the processor 208 may be enabled to insert and/or append timing information to packets. The processor 208 may provide control signals and/or instructions to the memory 202, the NIHW device 204, and the hardware security module 206. The processor 208 may execute instructions that may enable parsing received packets, assembling packets to be transmitted, storing and accessing information in the memory 202, generating and/or accessing security keys utilizing the hardware security module 206, receiving data and timestamp information from the NIHW device 204, and sending data to the NIHW device 204.

In an exemplary embodiment of the invention, the clock 210a may act as a master clock and the end system 102a may initiate synchronization with the end system 102b and the switch 104. The synchronization may, for example, utilize the precision time protocol (PTP). Upon completing a secure synchronization, timing information may be utilized to, for example, determine proximity information as described above in EQ. 1.

In an exemplary operation, the end system 102a may transmit a packet to the end system 102b. The processor 208a may interface with the memory 202a, the clock 210a, and/or the security module 206a to generate, and possibly secure, a first packet. In this regard, the first packet may comprise information and/or formatting that may enable a receiving node to authenticate it. Additionally, the first packet may be encrypted such that it may be kept confidential between selected nodes. The first packet may then pass to the NIHW device 204a, where it may be converted to a bit-stream and transmitted onto the link 106a. Additionally, the NIHW device 204a may generate a secure timestamp t1 corresponding to the time the first packet was transmitted onto the link 106a. The processor 208a may interface with the memory 202a, the clock 210a, and/or the security module 206a to generate a secure 'timestamp' packet comprising t1. In this regard, the 'timestamp' packet may comprise information and/or formatting that may enable a receiving node to authenticate the 'timestamp' packet. Additionally, the 'timestamp' packet may be encrypted such that it may be kept confidential between selected nodes. The 'timestamp' packet may be transmitted shortly after the transmission of the first packet.

The bit-stream comprising the first packet may arrive at the NIHW device 204c. The NIHW device 204c may generate a timestamp t2 corresponding to the arrival of the first packet. The NIHW device 204c may also receive the subsequent 'timestamp' packet comprising the timestamp t1. The NIHW device 204c may re-assemble the bit-streams into packets and may make the packets available to the processor 208c, the memory 202c, the clock 210c, and/or the security module 206c. The processor 208c may interface with the memory 202c and/or the security module 206c to authenticate and/or decrypt the received packets and the timestamps t1 and t2. The processor 208c may also interface with the memory 202c, the clock 210c, and/or the security module 206c to prepare the first packet for forwarding. In this regard, information and/or formatting that may enable a receiving node to authenticate the forwarded packets may be added to the first packet. Also, t1, t2, or some combination thereof, may be inserted in and/or appended to the first packet prior to forwarding. Additionally, the forwarded packets may be encrypted such that they are kept confidential between selected nodes. The first packet, modified to contain t1, t2, or some combination thereof, may be passed to the NIHW device 204c where it may be converted to a bit-stream and transmitted onto the link 106b. Additionally, the NIHW device 204c may generate a secure timestamp t3 corresponding to the time the first packet was forwarded onto the link 106b. The processor 208a may also interface with the memory 202a, the clock 210a, and/or the security module 206a to generate a secure 'timestamp' packet comprising t3. In this regard, the 'timestamp' packet may comprise information and/or formatting that may enable a receiving node to authenticate the packet and/or the timestamps. Additionally, the 'timestamp' packet may be encrypted such that it is kept confidential between selected nodes.

The bit-stream comprising the first packet may arrive at the NIHW device 204b. The NIHW device 204b may generate a timestamp t4 corresponding to the arrival of the sync packet. The NIHW device 204b may also receive the subsequent packet comprising the timestamp t3. The NIHW device 204b may re-assemble the bit-streams into packets and may make the packets available for processing by the processor 208b, the memory 202b, the clock 210b, and/or the security module 206b. The processor 208b may interface with the memory 202b, the clock 210b, and/or the security module 206b to authenticate and/or decrypt the first packet and the timing information contained within and/or appended to the packet. The end system 102b may utilize the timing information to determine, for example, the distance to the end system 102a, propagation delays over the links 106a, and 106b, and/or the processing time of the switch 104. In various embodiments of the invention, the end system 102b may generate a reply packet in response to the first packet. In this regard, the reply packet may contain t1, t2, t3, t4 or some combination thereof, and may traverse the network in a manner similar to the first packet, with time stamps t5, t6, t7, t8 or some combination thereof, being inserted in and/or appended to the reply packet. Accordingly, when the end system receives the reply packet it may be enabled to determine, for example, propagation delays in the network, processing delays in the network, and/or distances between nodes in the network.

Figure 3:
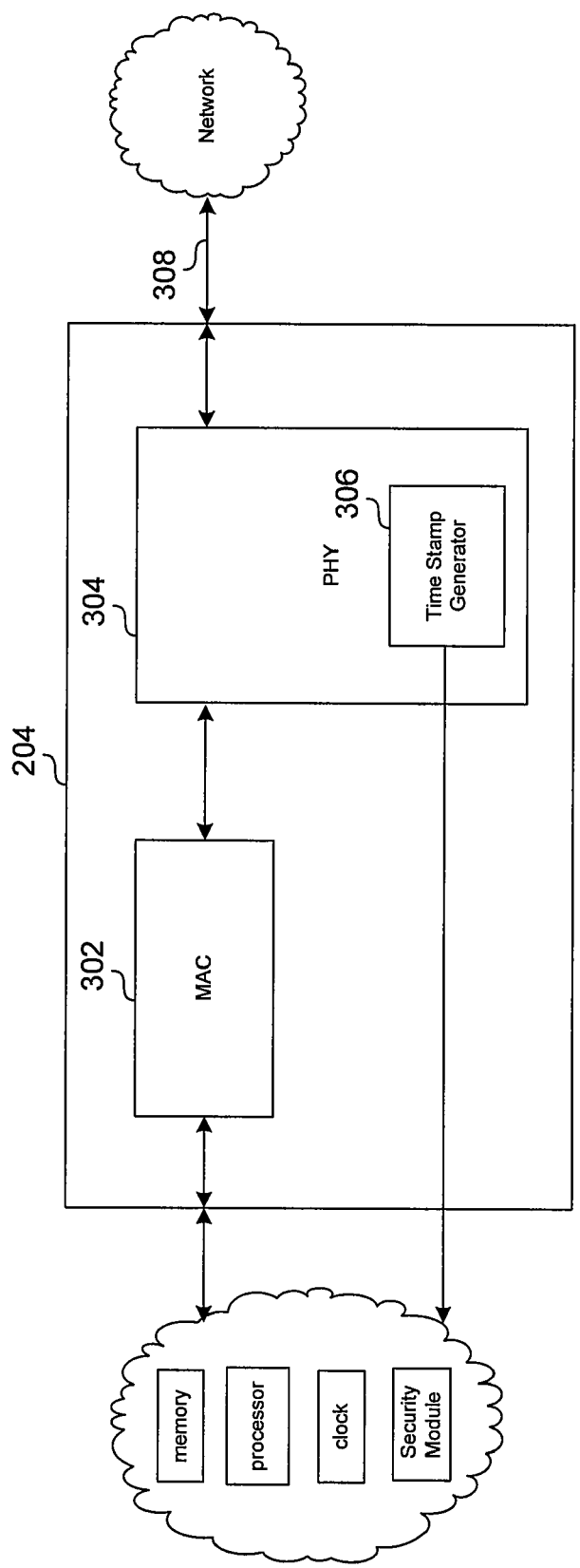
FIG. 3 is a block diagram of a network interface hardware (NIHW) device, in accordance with an embodiment of the invention.

FIG. 3 is a block diagram of a network interface hardware (NIHW) device in accordance with an embodiment of the invention. In this regard, the NIHW 204 may be as described in FIG. 2. Referring to FIG. 3 the NIHW device 204 may comprise a media access controller (MAC) 302, and a physical layer transceiver (PHY) 304.

The MAC 302 may comprise suitable logic, circuitry, and or code that may enable providing addressing and access control to a network such as the network 100. In this regard, the MAC 302 may enable multiple nodes to transmit and receive data over a common link. In one embodiment of the invention, the MAC 302 may enable communication over a network utilizing Ethernet protocols.

The PHY 304 may comprise suitable logic, circuitry, and/or code that may enable the PHY 304 to transmit or receive data bits over a physical medium. In this regard, the PHY 304 may enable converting between digital values and analog symbols impressed on the physical medium. In an exemplary embodiment of the invention, the medium may comprise twisted pair or coaxial cabling, and the transmitted symbols may be as defined by Ethernet protocols. The PHY 304 may additionally comprise a timestamp generator 306.

The timestamp generator 306 may comprise suitable logic, circuitry, and/or code that may enable an identification of a leading edge of one or more symbols in a physical medium and may generate a time stamp corresponding to the leading edge.

In operation, a symbol may arrive at the NIHW 204 via the physical link 308 and may be received by the PHY 304. The timestamp generator 306 may, for example, compare the voltage on the physical link to an internal reference voltage and generate a timestamp when the voltage on the link 308 exceeds the reference voltage. Additionally the PHY 304 may enable converting the received symbols to digital values. Upon assembling a packet, the PHY 304 may pass the packet to the MAC 302. The MAC 302 may be enabled to, for example, determine whether the packet is to be processed or dropped.

The NIHW device 204 may similarly transmit packets into the network. In this regard, the MAC 302 may determine whether the physical link in available and if so, may pass one or more packets to the PHY 304. The PHY 304 may convert the digital values received from the MAC 302 into series of analog symbols impressed onto the link 106. The timestamp generator 306 may compare the voltage impressed on the physical link to an internal reference voltage and generate a timestamp when the voltage on the link 308 exceeds the reference voltage.

Figure 4:
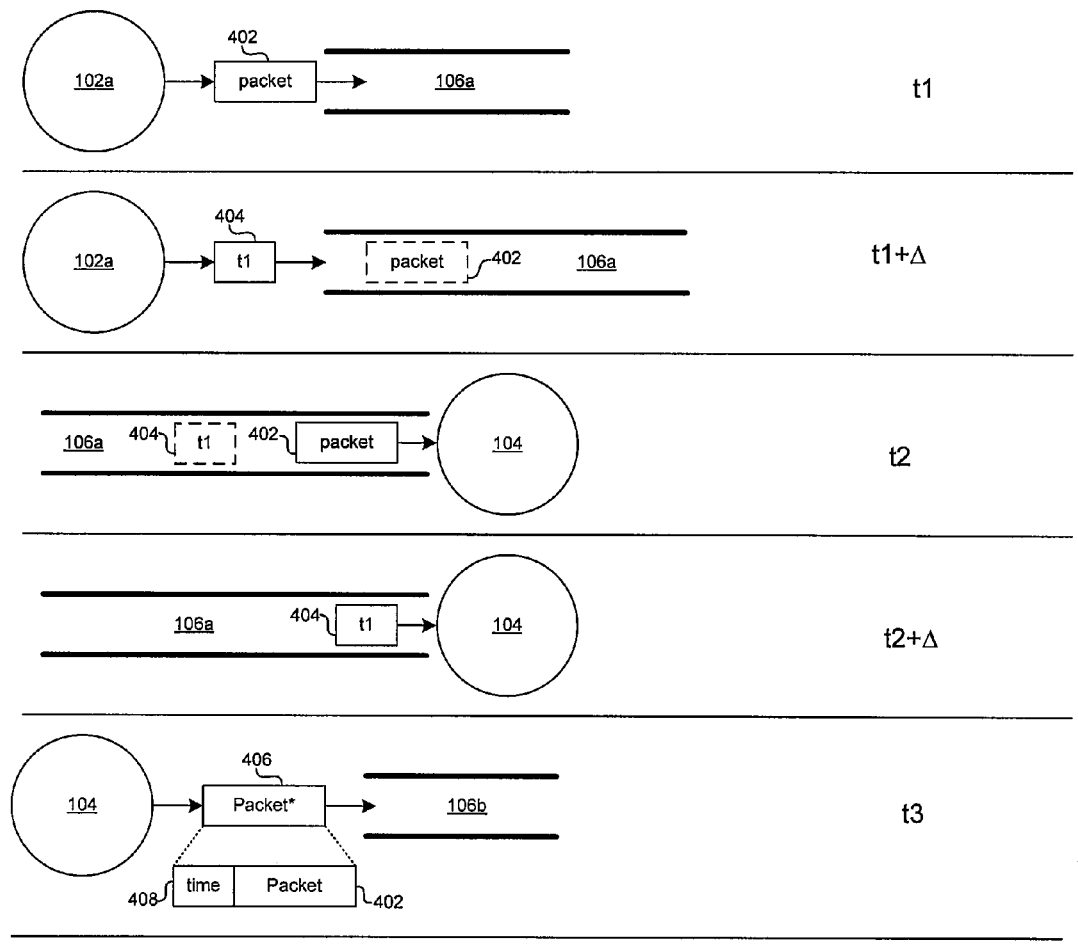
FIG. 4 is a diagram illustrating the modification of a packet to comprise timing information, in accordance with an embodiment of the invention.

FIG. 4 is a diagram illustrating the modification of a packet to comprise timing information, in accordance with an embodiment of the invention. Referring to FIG. 4 an exemplary sequence of events carried out by the nodes 102a and 104 of FIG. 1A is shown.

At time t1, a packet 402 may be transmitted onto the link 106a by the end system 102a. In this regard, the packet may, for example, comprise general data and/or control information. In one embodiment of the invention, the packet may comprise an Audio/Video Bridging over Ethernet registration packet. In this regard, the packet may be as described below in FIG. 5a. In another embodiment of the invention, the packet 402 may be an Audio/Video Bridging over Ethernet reservation packet. In this regard, the packet may be as described below in FIG. 5b.

Shortly after time t1, at time t1+Δ, the end system 102a may transmit a packet 404 comprising the timestamp t1. In this regard, since the timestamp may be generated at the physical layer, it may be transmitted subsequent to the packet 402 so as not to introduce any processing delay between generation of the timestamp and actual transmission of the packet 402 onto the link 106a.

At time t2, after a propagation delay corresponding to the time it takes the packet to travel the link 106a, the packet 402 may arrive at the switch 104. Accordingly, the switch 104 may generate a timestamp t2, corresponding to the arrival of the packet 402.

Shortly after time t2, at time t2+Δ, the timestamp packet 404 may arrive at the switch 104. At this point, the switch 104 has the timestamps t1 and t2 and can thus calculate the propagation delay, t2−t1, of the link 106a. Moreover, if the switch knows or can determine the speed of propagation of the link 106a, then the switch may calculate the length of the link 106a.

The switch 104 may process the packet 402 and may insert and/or append the timing information to the packet 402. In this regard, the switch 104 may append t1, t2, or some combination thereof to the packet 402 to generate the packet 406. In one embodiment of the invention, the switch 104 may append the propagation delay t2−t1 and the propagation speed of the link 106a. Accordingly, the packet 406 may comprise timing information 408 in addition to the packet 402.

At time t3, the packet 406 may be transmitted onto the link 106b. In this regard, the packet my, for example, comprise general data or control information. In one embodiment of the invention, the packet may comprise an Audio/Video Bridging over Ethernet registration packet. In this regard, the packet may be as described below in FIG. 5a. In another embodiment of the invention, the packet 402 may be an Audio/Video Bridging over Ethernet reservation packet. In this regard, the packet may be as described below in FIG. 5b.

Figure 5A:
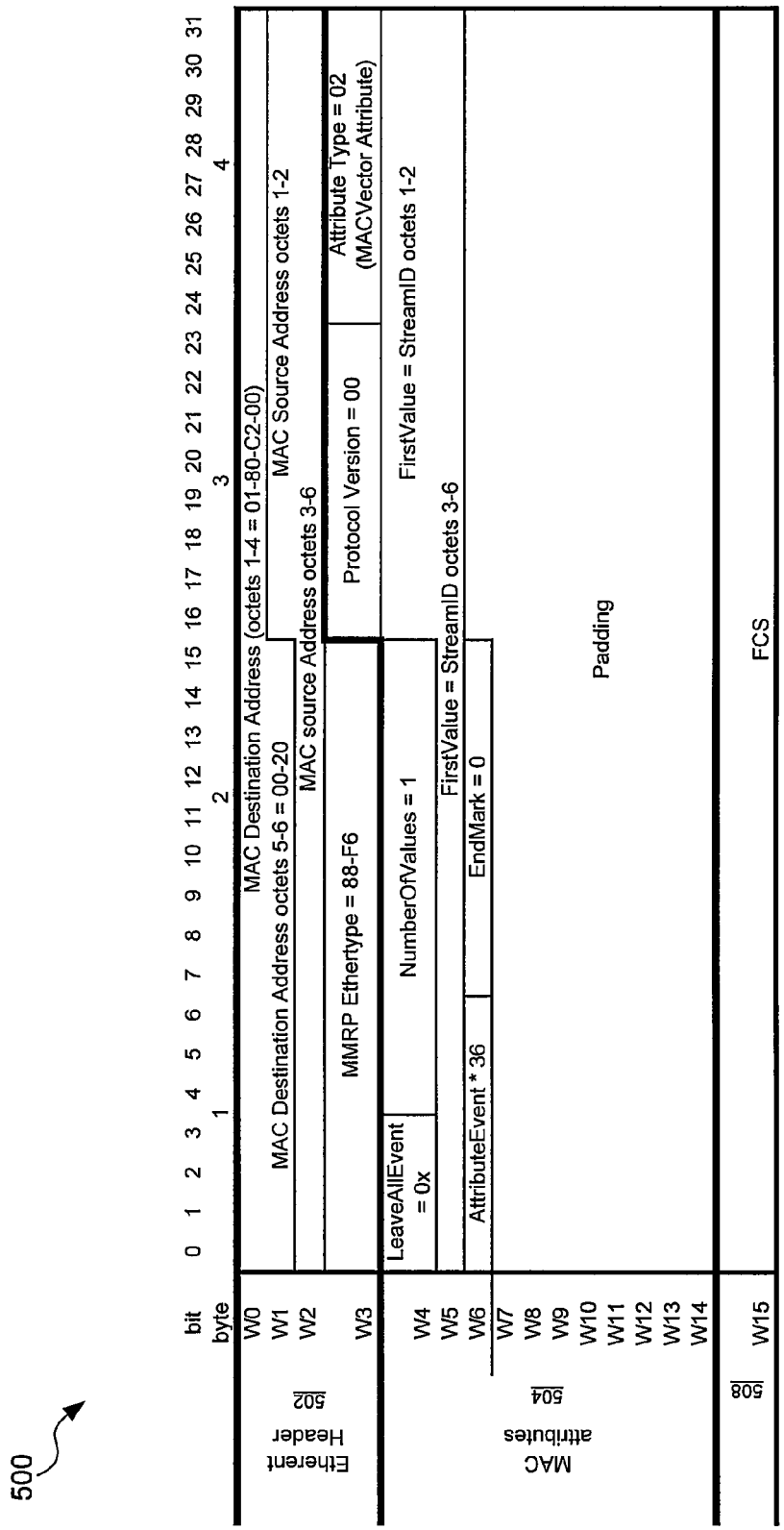
FIG. 5A is a diagram of a standard multiple multicast registration protocol (MMRP) registration frame, in connection with an embodiment of the invention.

FIG. 5A is a diagram of a standard multiple multicast registration protocol (MMRP) registration frame, in connection with an embodiment of the invention. The exemplary MMRP frame may comprise an Ethernet Header 502, MAC attributes 504, and an FCS 508. The Ethernet header 502 may comprise information for routing the frame 500 and identifying the frame as an MMRP registration frame. The MAC attributes 504 may comprise information for identifying a stream being registered by the frame 500 as well as one or more padding bits. The FCS 508 may comprise 1 or more bits for verifying and/or validating contents of the frame 500. Additional, details regarding the Ethernet header 502, the MAC attributes 504, and the FCS 508 may be found in applicable standards documents.

Figure 5B:
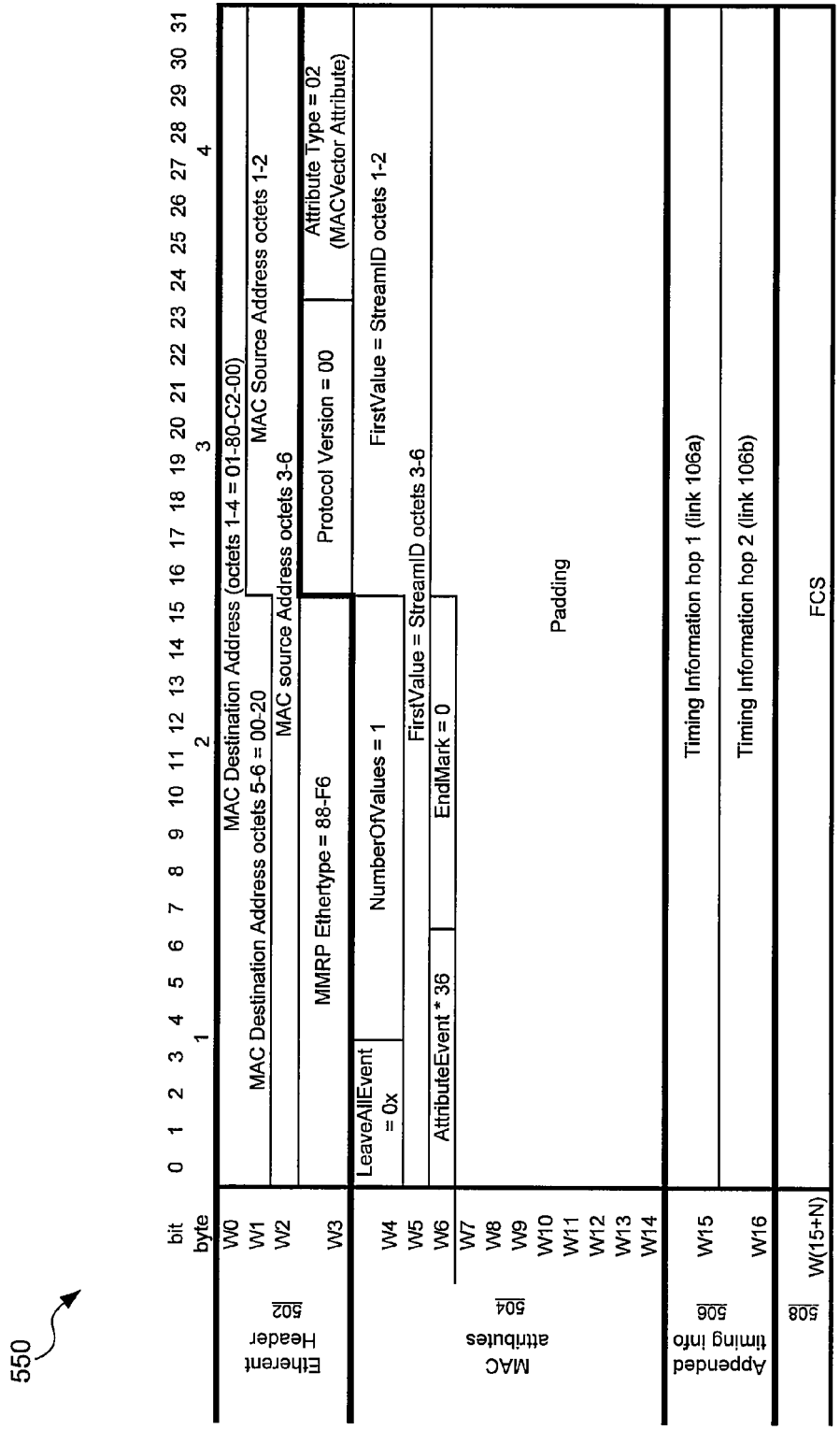
FIG. 5B is a diagram of a multiple multicast registration protocol (MMRP) registration frame modified to comprise per-hop timing and/or distance information, in accordance with an embodiment of the invention.

FIG. 5B is a diagram of a multiple multicast registration protocol (MMRP) registration frame modified to comprise per-hop timing and/or distance information, in accordance with an embodiment of the invention. Referring to FIG. 5B, in comparison to the frame 500 of FIG. 5A, the frame 550 may additionally comprise appended timing information 506.

The appended timing information 506 may comprise one or more indications of timestamps and/or combinations of timestamps, in accordance with an embodiment of the invention. In this regard, timing information may be appended for each hop the frame 500 traverses. Moreover, the appended timing information combined with knowledge of the physical layer technology of a network hop may enable accurate determination of the length of each hop as described above in EQ. 1. In various embodiments of the invention, the field 506 may be populated with distance calculations instead of or in addition to raw timing information.

In an exemplary embodiment, the frame 550 may be sent by end system 102a to the switch 104, and from the switch 104 to the end system 102b. Accordingly, the switch 104 may append the timing information for hop 1 (link 106a) and the end system 102b may append the timing information for hop 2 (link 106b). Although, this exemplary embodiment of the invention comprises only two hops, the invention is not limited in this regard. Accordingly, timing and/or distance information for any number of hops, 'N', may be appended to the registration frame, where N is greater than or equal to 1.

Figure 6A:
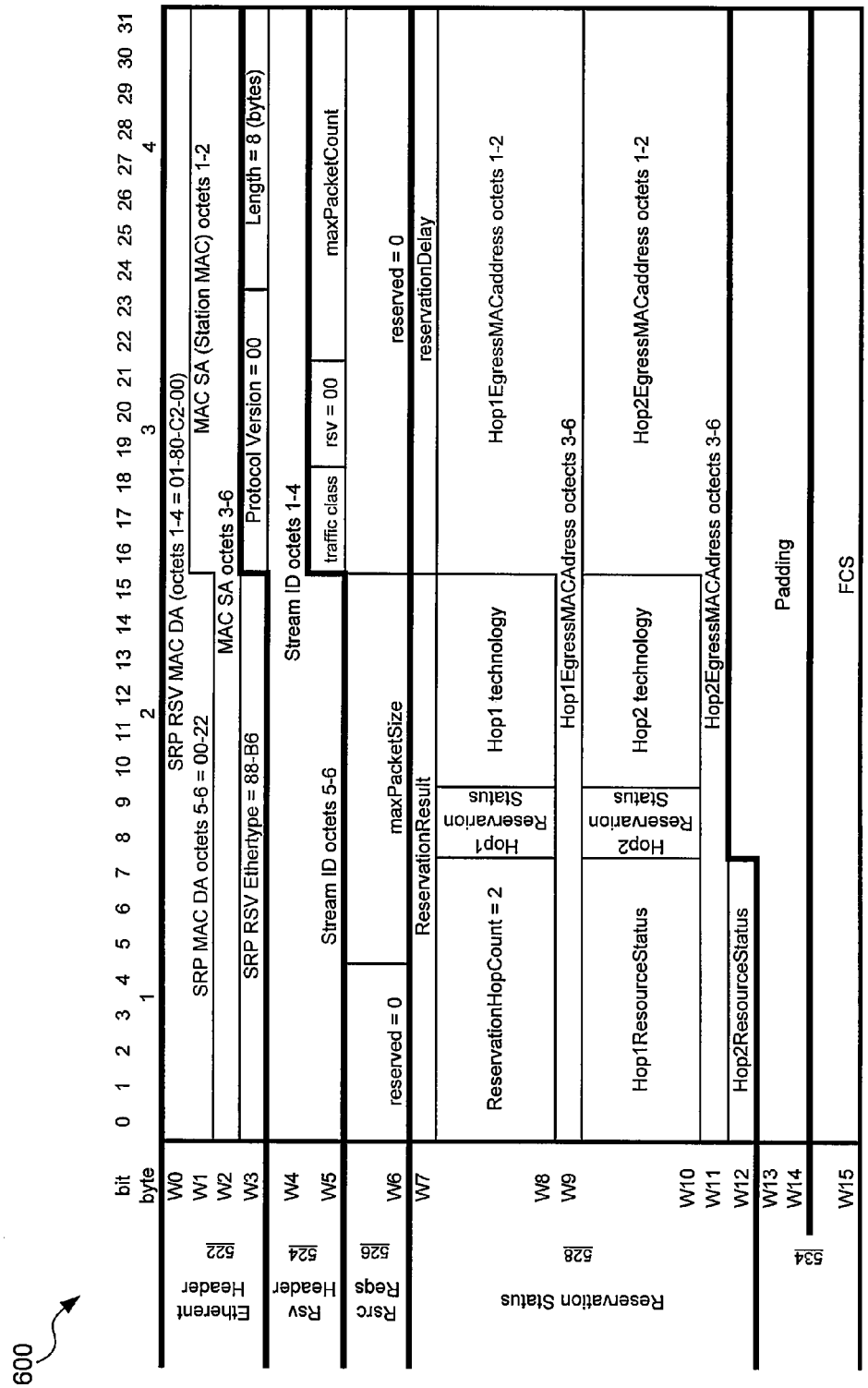
FIG. 6A is a diagram of a standard Stream Reservation Protocol (SRP) reservation frame, in connection with an embodiment of the invention.

FIG. 6A is a diagram of a standard Stream Reservation Protocol (SRP) reservation frame, in connection with an embodiment of the invention. The Exemplary SRP reservation frame 520 may comprise an Ethernet header 522, reservation header 524, resource requirements 526, reservation status 528, padding 530 and an FCS 524. The Ethernet header 502 may comprise information for routing the frame 500 and identifying the frame as an SRP reservation frame. The reservation header 524 may comprise information for identifying a stream associated with the frame 520. The resource requirements 526 may comprise information for identifying traffic class, packet size and packet count for a stream associated with the frame 520. The reservation status 528 may comprise information indicating, for example, whether a reservation is valid and the maximum worst case delay for a reserved stream. The padding 530 may be utilized to adjust the size of the frame 520. The FCS 534 may comprise 1 or more bits for verifying and/or validating contents of the frame 520. Additional details regarding the Ethernet header 522, reservation header 524, resource requirements 526, reservation status 528, padding 530, and the FCS 524 may be found in applicable standards documents.

Figure 6B:
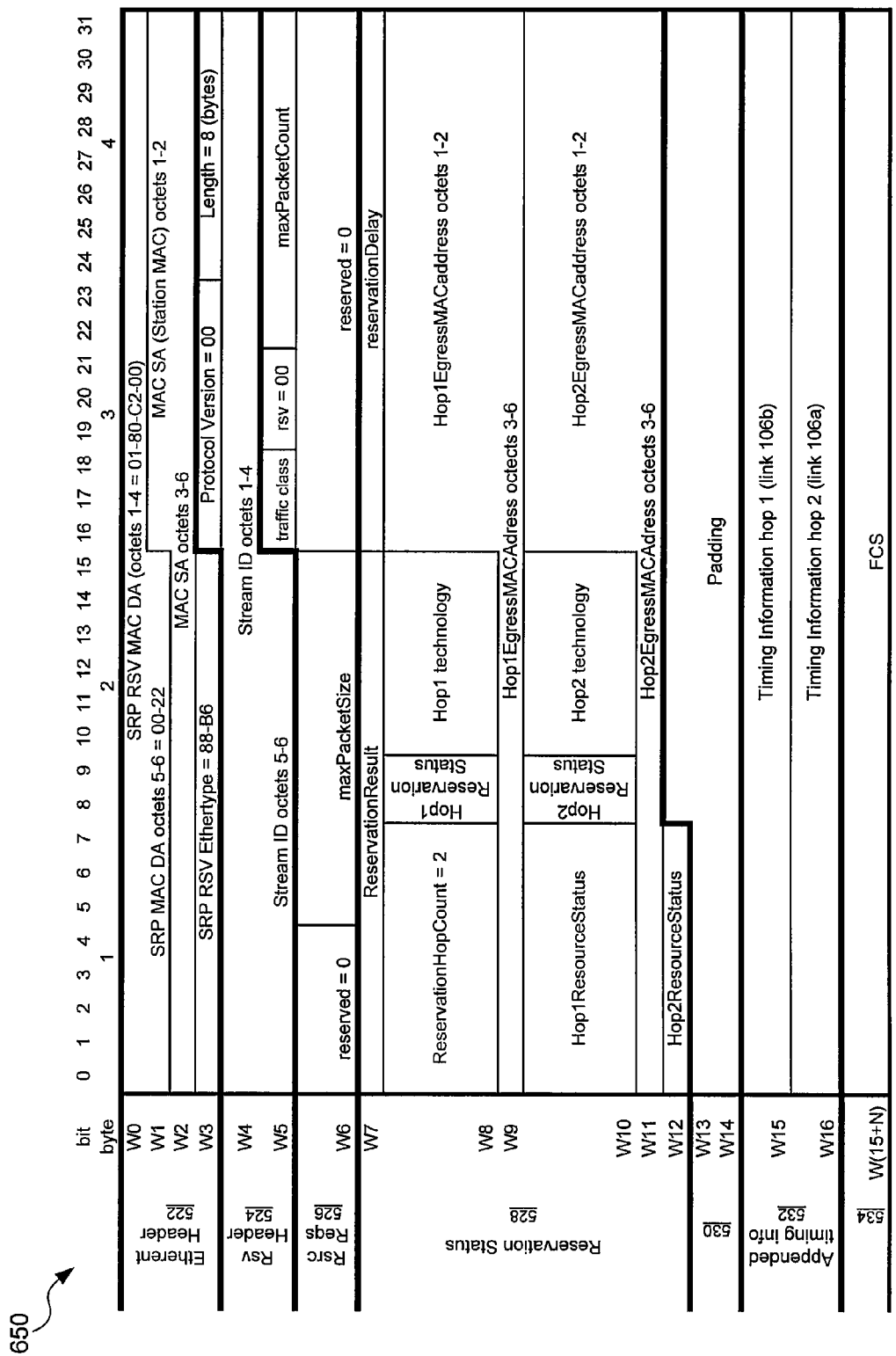
FIG. 6B is a diagram of a Stream Reservation Protocol (SRP) reservation frame modified to comprise per-hop timing and/or distance information, in accordance with an embodiment of the invention.

FIG. 6B is a diagram of a Stream Reservation Protocol (SRP) reservation frame modified to comprise per-hop timing and/or distance information, in accordance with an embodiment of the invention. Referring to FIG. 6B, in comparison to the frame 600 of FIG. 6A, the frame 650 may additionally comprise appended timing information 532.

The appended timing information 532 may comprise one or more indications of timestamps and/or combinations of timestamps, in accordance with an embodiment of the invention. In this regard, timing information 532 may be appended for each hop the frame 520 traverses. Moreover, the appended timing information combined with knowledge of the physical layer technology of a network hop may enable accurately determining the length of each hop as described above in EQ. 1. In various embodiments of the invention, the field 532 may be populated with distance calculations instead of or in addition to raw timing information.

In an exemplary embodiment, the frame 650 may be sent by end system 102b to the switch 104, and from the switch 104 to the end system 102a. Accordingly, the switch 104 may append the timing information for hop 1 (link 106a) and the end system 102b may append the timing information for hop 2 (link 106b). In this manner, reservation of resources in the switch 104 and the end system 102a may be based on the delay and or distance from the end system 102b. For example, in instances that the node 102a is too far from the node 102a and/or from the switch 104, the frame 650 may be dropped and resources in the node 102b may not be reserved. Although, this exemplary embodiment comprises only two hops, the invention is not limited in this regard. Accordingly, timing and/or distance information for any number of hops, 'N', may be appended to the registration frame.

Aspects of a method and system for determination and exchange of network timing information are provided. In this regard, for each network hop traversed by a packet (e.g. hops 106a and 106b of FIG. 1A), a propagation delay of said network hop may be determined. Moreover, the propagation delay, and/or a hop length calculated utilizing the propagation delay, may be appended to the packet. The packet may, for example, be a MMRP registration (e.g., 550 of FIG. 5B) packet or a SRP reservation packet (e.g., 650 of FIG. 6B). The packet may be dropped in instances that the propagation delay and/or length of a one or more traversed network hops is outside a determined range (e.g., when traversing hop 132 of FIG. 1B). The hop length may be determined by multiplying the propagation delay by a speed of propagation on the hop. The speed of propagation may be determined based on the physical layer technology associated with the network hop. Digital rights management may be implemented for media communicated on the network hop based at least in part on the hop length or the propagation delay. In this regard, use of media content may be restricted to a specified location.

Another embodiment of the invention may provide a machine-readable storage, having stored thereon, a computer program having at least one code section executable by a machine, thereby causing the machine to perform the steps as described herein for determination and exchange of network timing information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
performing by one or more circuits and/or processors in a network node:
receiving a packet via a network physical link, wherein said received packet comprises a plurality of time stamps of one or more sending nodes traversed by said received packet along said network physical link;
determining, utilizing said plurality of time stamps of said one or more sending nodes, a propagation delay of said network physical link;
calculating, utilizing said determined propagation delay, a length of said network physical link by multiplying said determined propagation delay by a speed of propagation along said network physical link;
appending, to said packet, one or both of:
said determined propagation delay; and
said length of said network physical link.

2. The method according to claim 1, wherein said packet is a multiple multicast registration protocol (MMRPI registration packet.

3. The method according to claim 1, wherein said packet is a Stream Reservation Protocol (SRPI reservation packet.

4. The method according to claim 3, comprising dropping said packet when said determined propagation delay or said determined length of said network physical link is outside a determined range.

5. The method according to claim 3, comprising dropping said packet when a total propagation delay of all network physical links traversed by said packet or a total length of all network physical links traversed by said packet is outside a determined range.

6. The method according to claim 1, wherein said speed of propagation is determined based on a physical layer technology associated with said network physical link.

7. The method according to claim 1, comprising establishing digital rights management for media content communicated via said network physical link based, at least in part, on said length of said network physical link or said propagation delay.

8. The method according to claim 7, comprising limiting, via said digital rights management, use of media content to a specified location based on said length of said network physical link or said propagation delay.

9. A non-transitory storage having stored thereon, a computer program having at least one code section for networking, the at least one code section being executable by a machine for causing the machine to perform steps comprising:
receiving a packet via a network physical link, wherein said received packet comprises a plurality of time stamps of one or more sending nodes traversed by said received packet along said network physical link;
determining, utilizing said plurality of time stamps of said one or more sending nodes, a propagation delay of said network physical link;
determining, utilizing said propagation delay, a length of said network physical link by multiplying said determined propagation delay by a speed of propagation along said network physical link; and appending, to said packet, one or both of:
said determined propagation delay; and
said length of said network physical link.

10. The machine-readable storage according to claim 9, wherein said packet is a multiple multicast registration protocol (MMRP) registration packet.

11. The machine-readable storage according to claim 9, wherein said packet is a Stream Reservation Protocol (SRP) reservation packet.

12. The machine-readable storage according to claim 11, wherein said at least one code section comprises code for dropping said packet when said determined propagation delay or said determined length of said network physical link is outside a determined range.

13. The machine-readable storage according to claim 11, wherein said at least one code section comprises code for dropping said packet when a total propagation delay of all network physical links traversed by said packet or a total length of all network physical links traversed by said packet is outside a determined range.

14. The machine-readable storage according to claim 9, wherein said speed of propagation is determined based on a physical layer technology associated with said network physical link.

15. The machine-readable storage according to claim 9, wherein said at least one code section comprises code for establishing digital rights management for media content communicated via said network physical link based, at least in part, on said length of said physical link or said propagation delay.

16. The machine-readable storage according to claim 15, wherein said at least one code section comprises code for limiting, via said digital rights management, use of media content to a specified location based on said length of said network physical link or said propagation delay.

17. A system for networking, the system comprising:
one or more circuits and/or processors in a network node that are operable to:
receive a packet via a network physical link, wherein said received packet comprises a plurality of time stamps of one or more sending nodes traversed by said received packet along said network physical link;
determine, utilizing said plurality of time stamps of said one or more sending nodes, a propagation delay of said network physical link;
determine, utilizing said propagation delay, a length of said network physical link by multiplying said determined propagation delay by a speed of propagation along said network physical link; and
append, to said packet, one or both of:
said determined propagation delay; and
said length of said network physical link.

18. The system according to claim 17, wherein said packet is a multiple multicast registration protocol (MMRP) registration packet.

19. The system according to claim 17, wherein said packet is a Stream Reservation Protocol (SRP) reservation packet.

20. The system according to claim 19, wherein said one or more circuits and/or processors are operable to drop said packet when said determined propagation delay or said determined length of said network physical link is outside a determined range.

21. The system according to claim 19, wherein said one or more circuits and/or processors are operable to drop said packet when a total propagation delay of all network physical links traversed by said packet or a total length of all network physical links traversed by said packet is outside a determined range.

22. The system according to claim 17, wherein said speed of propagation is determined based on a physical layer technology associated with said network physical link.

23. The system according to claim 17, wherein said one or more circuits and/or processors are operable to establish digital rights management for media content communicated via said network physical link based, at least in part, on said length of said network physical link or said propagation delay.

24. The system according to claim 23, wherein said one or more circuits and/or processors are operable to limit, via said digital rights management, use of media content to a specified location based on said length of said network physical link or said propagation delay.

* * * * *